(12) United States Patent
Fred

(10) Patent No.: US 7,416,359 B2
(45) Date of Patent: *Aug. 26, 2008

(54) LETTER OPENING STYLUS AND WRITING INSTRUMENT WITH POCKET CLIP

(76) Inventor: Barker Fred, 7999 Paisley Ave., Hesperia, CA (US) 92345

( * ) Notice: Subject to any disclaimer, the term of this patent is extended or adjusted under 35 U.S.C. 154(b) by 541 days.

This patent is subject to a terminal disclaimer.

(21) Appl. No.: 11/009,342

(22) Filed: Dec. 10, 2004

(65) Prior Publication Data

US 2006/0193677 A1   Aug. 31, 2006

Related U.S. Application Data

(63) Continuation of application No. 10/827,877, filed on Apr. 21, 2004, now Pat. No. 7,287,925.

(51) Int. Cl.
*B43K 1/10*   (2006.01)
*B43K 29/00*   (2006.01)
*B26B 11/00*   (2006.01)

(52) U.S. Cl. .......................... 401/258; 401/195; 7/158; 7/160

(58) Field of Classification Search ............. 401/29–33, 401/52, 195, 258–260; 7/118–120, 158, 7/160
See application file for complete search history.

(56) References Cited

U.S. PATENT DOCUMENTS

| | | | |
|---|---|---|---|
| 1,598,427 A * | 8/1926 | Easton | 30/123 |
| D362,649 S | 9/1995 | Rak et al. | |
| D390,872 S | 2/1998 | Sunaga | |
| D431,598 S | 10/2000 | Kim et al. | |
| 6,227,743 B1 | 5/2001 | Robb | |
| D458,635 S | 6/2002 | Boyle et al. | |
| 6,450,721 B1 | 9/2002 | D'Amico et al. | |
| D483,065 S | 12/2003 | Cetera | |
| 6,749,354 B2 | 6/2004 | Kageyama et al. | |
| 6,893,179 B2 * | 5/2005 | Kageyama et al. | 401/32 |
| 7,287,925 B2 * | 10/2007 | Barker | 401/195 |

* cited by examiner

*Primary Examiner*—David J Walczak
(74) *Attorney, Agent, or Firm*—Kirk A. Buhler; Buhler & Associates

(57) ABSTRACT

An improvement to a writing instrument with stylus, a pocket clip and an integrated letter-opening blade. The improvement consists of locating the letter-opening blade in the pocket clip of the pen. The blade is prevented from cutting the pocket of the user due to a blade protector that is mechanically linked to the mechanism that extends and retracts with the marking or writing tip. In an alternate embodiment, the blade is located on the opposite side of the pocket clip. The extending and retracting mechanism can be a variety of types including twist, press, sliding. The stylus provides input to a PDA, touch screen or other tactile input device. Another embodiment includes a letter opener with a stylus.

8 Claims, 3 Drawing Sheets

LETTER OPENING STYLUS AND WRITING INSTRUMENT WITH POCKET CLIP

This application is a continuation of application Ser. No. 10/827,877, filed on Apr. 21, 2004 now U.S. Pat. No. 7,287,925, the entire contents of which is hereby expressly incorporated by reference herein.

FIELD OF THE INVENTION

The present invention relates generally to a writing instrument with a letter opener integrated into the pocket clip and a stylus integrated into the writing instrument. More specifically the writing instrument can be a pen pencil or other type-marking instrument with a clip for holding the writing instrument onto a pocket and a stylus for use with a PDA touch screen or other tactile input device. The clip includes a protected cutting blade that can be used to open a letter of cut paper or other material. The mechanism that extends the marking tip moves the blade or protective cover, so the blade does not cut the pocket when the writing instrument is not in the marking position. The stylus may be spring loaded to absorb some of the downward pressure a user may apply to the stylus.

BACKGROUND OF THE INVENTION

People use many different types and styles of writing instruments today. Many people will receive mail or letters and will open the mail or letters using a variety of methods including tearing, or cutting open a letter using a stiletto, knife, scissors or a letter opener. In addition people may use a stylus pencil or pen with their PDA to enter or select data or information. This requires the use of two or three tools i.e. the writing instrument the opener and the stylus. Several inventions have been patented or sold that combine the some of these instruments into one.

U.S. Pat. No. 844,770 issued to C. G. Bauer discloses an envelope-opener where the letter opener can be connected onto a writing instrument. A letter is placed within a guide to position the envelope for opening. As the envelope is slid into the guide, the folded portion of the letter is cut open with an "L" shaped blade. While this design can be carried inside a pocket without damage to the pocket, the invention is not designed to be clipped onto a pocket. In addition, the blade remains exposed, and there is no link from the writing tip extending mechanism to the blade protector nor is stylus present in the device.

U.S. Pat. No. 6,065,169 issued to Cheldin discloses a combination letter opener and writing instrument. The letter opener is a similar configuration to other concealed blade letter openers that are available. This patent is disclosed as both an opener that can be attached to an existing pen, and as an opener that in integrated into the writing instrument housing. In some disclosures of this invention, the point of the pen has a retractable point. While this invention provides both a writing instrument and a letter opener, the invention fails to provide a clip for maintaining the invention on a pocket. The blade has no protection mechanism that shields the blade, and there is no link from the writing tip extending mechanism to the blade protector. Further this device does not provide a stylus.

WEB site www.creativeconceptsgolf.com discloses a Swiss pen that includes a writing instrument with multi-functional tools such as scissors, knife, tweezers and flashlight. While these tools can be used to open a letter, they do not provide a blade protection mechanism, and once the blade is opened, the blade is exposed without protection. This device also does not provide a stylus.

WEB site www.glbproducts.com and other site disclose a pen where the back cap of the pen covers a stiletto blade for opening a letter. This pen provides a writing instrument with a letter-opening tool, and in some cases, the product may include a pocket clip, but the blade is fully exposed when the rear cap is removed, and the blade is not integrated into the pocket clip. In addition, there is no link from the writing tip extending mechanism to the blade protector. This device does not provide a stylus.

Design patents D483,065, D458,635, D431,598, D390,872, and D362,649 show writing instruments with a stylus integrated within the writing instrument. But none of these design patents also provide a letter opening mechanism. They further do not provide that the stylus be spring loaded to absorb some of the downward pressure from the stylus.

U.S. Pat. No. 6,749,354 issued to Kageyama et al discloses a composite writing implement that combines a pen, pencil and a stylus tip. While this patent includes a stylus in a pen, it does not include a letter opener nor does it disclose a letter opener and stylus combination.

U.S. Pat. No. 6,450,721 issued to D'Amico et al. discloses a pen stylus combination where the pen is on one end and the stylus is on the other end. While this patent includes a stylus in a pen, it does not include a letter opener nor does it disclose a letter opener and stylus combination.

U.S. Pat. No. 6,227,743 issued to Robb discloses a pen cap for use as a stylus on touch screens. While this patent includes a pen cap that is a stylus, it does not include a letter opener nor does it disclose a letter opener and stylus combination.

Other issued patents disclose letter openers, but none of the letter openers disclose a stylus integrated within the letter opener. None of the patents disclose that the stylus is spring loaded, and none of them disclose that the pen includes a letter opener with a stylus.

What is needed is a writing instrument with a pocket clip where a letter opener is integrated into the pocket clip. The ideal invention would not damage a pocket, by either being located on the opposite side of the pocket clip or being protected when the writing point is retracted, and the blade would be exposed when the writing point is extended. This ideal product would also include a stylus for use with a PDA, touch screen or other device that requires tactile input.

BRIEF SUMMARY OF THE INVENTION

It is an objective of the present invention to provide a writing instrument that combines a writing instrument with a letter opener and a stylus. The writing instrument includes a clip for attaching the writing instrument to a pocket with a stylus. The pocket clip includes a blade for opening a letter. The blade is prevented from causing damage to a pocket with a blade protector that is operated with mechanism that extends and retracts the writing tip. The stylus provides writing, pointing and or selecting mechanism for use with a PDA, touch screen or other tactile input device.

The writing instrument can take the form of many different types of instruments including pencil, pen, marker or highlighter. All these writing instruments are generally formed from an elongated cylindrical shape. The cylindrical shape is tapered on one or both ends to allow easier gripping of the writing instrument. The cylinder is generally hollow, and inside the hollow portion of the pen ink, carbon, or marking material is stored or dispensed.

The writing tip has generally two positions, one where the tip is concealed within the cylindrical housing, and the second position where the tip is extended outside the cylindrical housing. Numerous methods can used to extend or retract the writing tip. These methods include depressing a button on the end of the pen, twisting the pen or sliding a tab located on the side of the pen.

The writing instrument includes a clip that allows the writing instrument to be attached to a pocket. The clip can be molded from the material the housing is made from, or can be formed from a spring type material such as metal and be attached to the cylindrical housing. Within the clip, a letter-opening blade is located. A blade protection mechanism is located on one or two sides of the blade to prevent damage to a pocket when the pen is clipped to a pocket. The blade protection mechanism is linked to the marking tip moving mechanism such that when the tip is extended the blade is exposed, and when the tip is retracted, the blade is at least partially covered to prevent damage to a pocket.

In order to open a letter, the tip of the pen is exposed. This also retracts the blade protection mechanism. If the blade is located in the back of the pocket clip, the pen is simply turned around. The fold of the letter is slid into the pocket clip, and the letter is drawn through the pocket clip and past the blade to open the letter. The letter is brought completely through the pocket clip, to open the entire folded edge of the letter. After opening the letter, the tip of the pen is retracted, and the blade is again protected so the pen can be clipped to a pocket.

The stylus can be located at either end of the writing instrument. The stylus can be the end of the pen a user might depress to extend the writing tip or the blade, or the stylus act like a writing tip and extend from the tip of the writing instrument.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1:
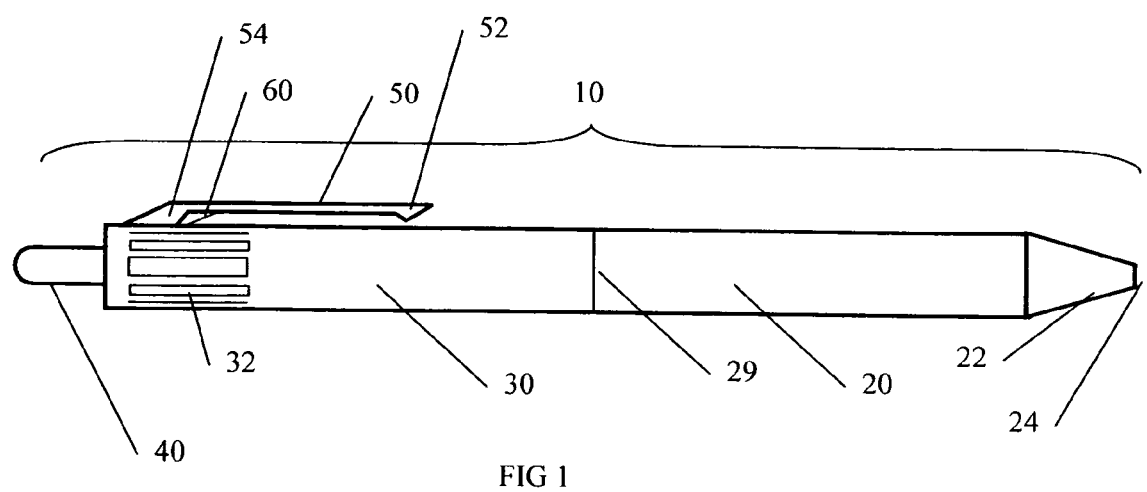
FIG. 1 is a view of an embodiment of the invention with a push activated writing point extender and stylus.

Referring first to FIGS. 1 through 5, that show the invention in a variety of elongated pen configurations. The basic shape of the pen consists of cylindrical bodies, items 20 and 30 that are pressed, connected, screwed or telescope into each other at item 29. The writing instrument can be made from a variety of materials including, metal, plastic, wood or mineral such as marble, granite or rock. In the preferred embodiment the writing instrument is tapered, item 22, at the end where the marking or writing tip extends, item 24. The taper allows easier grasp of the writing instrument. The tapered end may also include a cushion or gripping device that makes the writing instrument easier to hold. At the end opposite the writing tip, the end may be tapered, rounded, or squared depending upon design preferences. This end may also include a writing tip actuation mechanism. The cylindrical shaft of the pen may be smooth, rough, or include a variety details item 32, for appearance, or to improve comfort to the user. The writing instrument includes a pocket clip or retaining device, item 50 that allows the pen to be held in position on a pocket, shirt, or other thin surface. The pocket clip includes at least one pinch point, item 52 that provides a pinch point to hold the pen onto a thin surface. The pocket clip attaches to the body of the pen at item 54. At the area where the pocket clip attaches to the pen body, a thin blade, item 60 is located. The blade may be exposed, protected, or movable based upon the construction of the pen.

FIG. 1, item 10 is a pen where the writing tip, item 24, is extended when the stylus, item 40 located on the back of the pen is pressed into the pen. Once the stylus is depressed, the writing tip extends out the tapered end of the pen, item 22, and locks in an extended position. As the writing tip is extended the letter-opening blade, item 60 is exposed to allow the pen to open letters. The decorative details, item 32 on the side of the pen are depressions or raised areas located on the pocket clip end of the writing instrument. The letter opening blade, item 60 is located under the pocket clip. The stylus may include a spring to reduce the downward force when the stylus is used on a PDA, touch screen or other tactile input device. In some embodiments, the spring may be an integral part of the pen retraction and extension mechanism.

Figure 2:
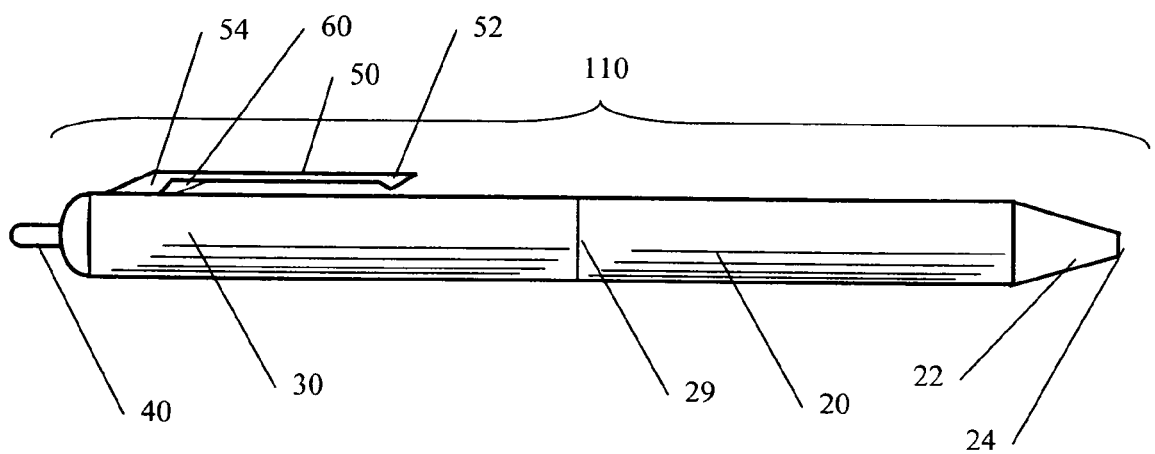
FIG. 2 is an alternate embodiment of the invention with a twist activated writing point extender and stylus.

FIG. 2, item 110 is an alternate embodiment of the invention with a twist activated writing tip extender. This figure also shows the letter-opening blade, item 60 located within the pocket clip. The end of the pen opposite the writing tip is shown as a rounded end.

Figure 3:
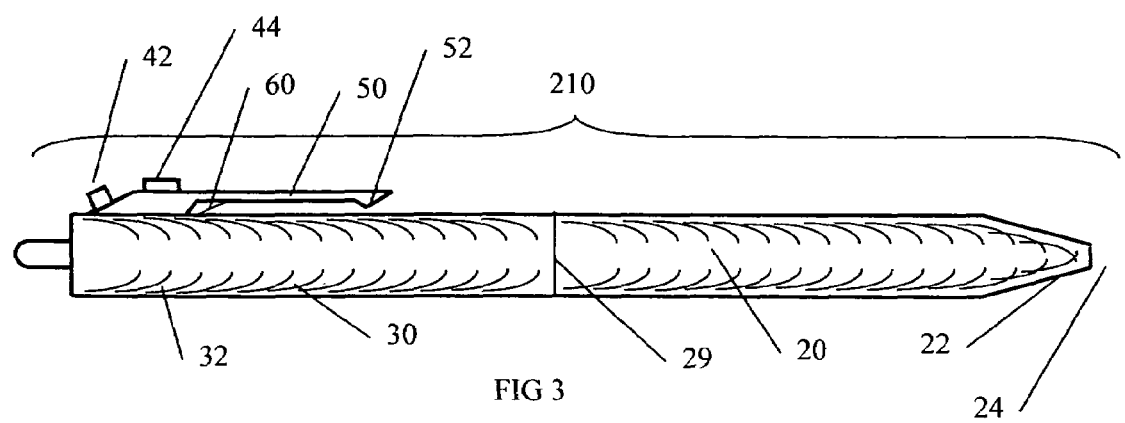
FIG. 3 is an alternate embodiment of the invention with a side activated writing point extender and stylus.

FIG. 3, item 210 is an alternate embodiment of the invention with a slide activating, writing tip extender, item 44. In this embodiment, pressing button, item 42, retracts the writing tip. The decorative details, item 32 on the side of the pen in this figure are scribed marks in the side of the surface of the writing instrument.

Figure 4:
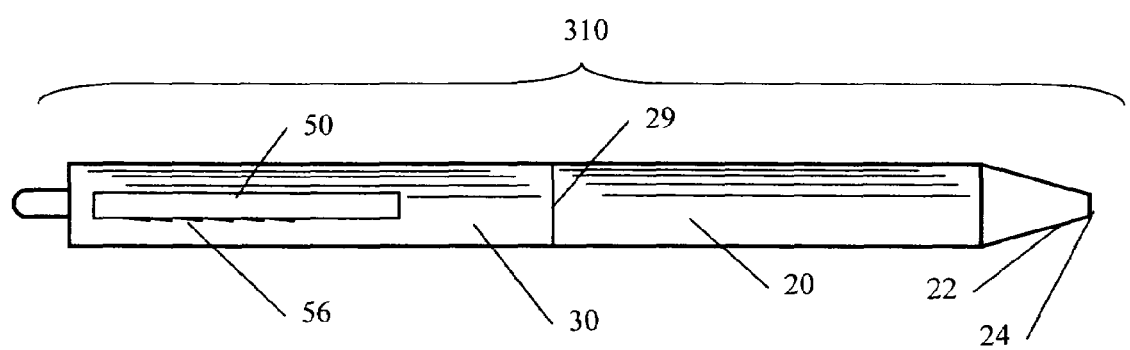
FIG. 4 is an alternate embodiment of the invention with a removable cap having a serrated edge on the pocket clip and stylus.

FIG. 4, item 310 is an alternate embodiment of the invention with a removable cap. The removable cap has a serrated edge, item 56 on the pocket clip, item 50. The serrations on the side of the pocket clip allow the pocket clip to cut or saw the letter open without causing damage to a pocket.

Figure 5:
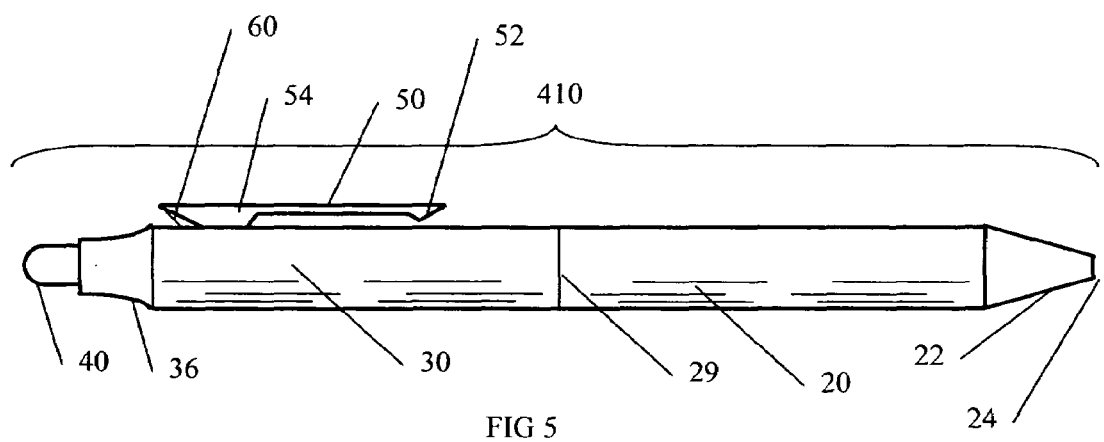
FIG. 5 is an alternate embodiment where the blade is located in the back of the pocket clip and stylus.

FIG. 5, item 410 is an alternate embodiment of the invention. In this embodiment, the letter-opening blade, item 60 is located on the pocket clip on the side opposite where the clip is attached to a pocket. This embodiment shows the pen with a rear activating writing tip extender 40, that is also a stylus, but the method of exposing the writing tip can be any variety including the removable cap type. At the end where the letter-opening blade is located, the housing is tapered or shaped, item 36, to allow easier insertion of the letter.

Figure 6:
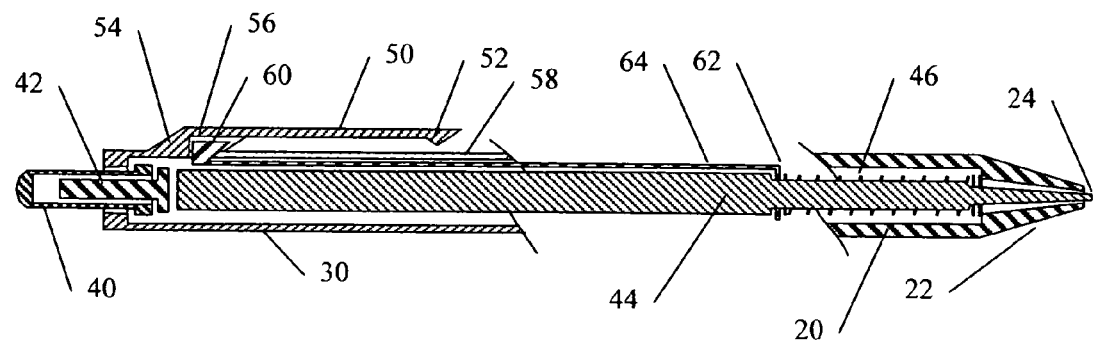
FIG. 6 is a cross sectional view of the blade protection mechanism, and the link with the writing point extending mechanism and stylus.
Figure 7:
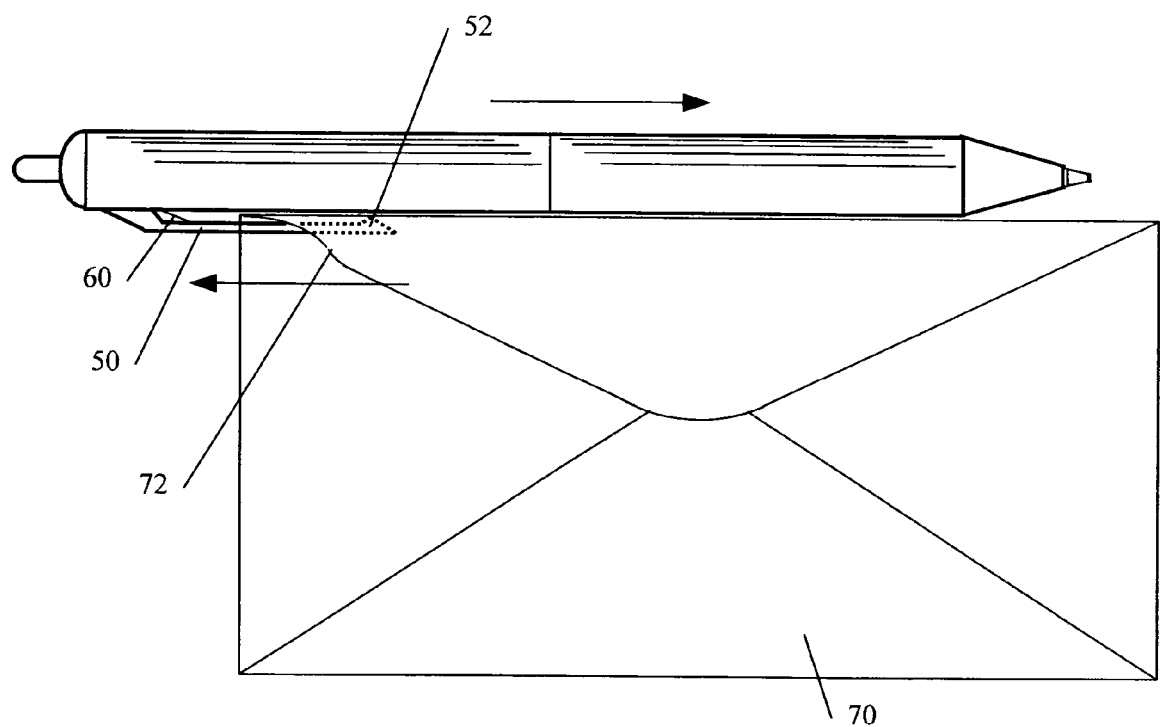
FIG. 7 shows a letter in position where the letter is being opened using the invention.

FIG. 6 is a cross sectional view of the blade extending/exposing mechanism, and the link with the pen point extending mechanism. This embodiment shows a stylus, 40 that also acts as writing tip extender but twisting the pen, or sliding an activator can extend the writing tip. In this figure, portions of the two halves of the pen are shown, items 20 and 30. This embodiment is a pen where item 44, is the body of the pen. The body of the pen necks down to create a shoulder for a spring, item 46. The letter-opening blade is formed from a piece of flat metal. The formed letter-opening blade contains a ring hole, item 62 that locates between the shoulder of the pen and the spring. The formed metal then includes a slender strip, item 64 that runs along the inside of the pen body. The end of the formed metal is bent and sharpened to form the blade, item 60. The blade is protected within a cavity, item 56 located within the pocket clip. To assemble the pen, the blade slides within a slot, item 58 located along the side of the pen. The two halves are then threaded, screwed, pressed or otherwise joined together. In this embodiment, the stylus located in the cap of the pen 40 includes an opening that allows a second pen extension-locking piece, item 42. When the end of the pen is depressed, the second pen extension-locking piece rotates, and holds the writing tip in an extended position. When the end is depressed a second time, the second pen extension-locking piece rotates again and the writing tip is retracted. The formed metal blade moves with the body of the pen, and when the writing tip is extended, the blade is moved out of the cavity, item 56. When the writing tip is retracted, the blade is returned to the cavity under the pocket clip.

FIG. 6 shows a letter in position where the letter is about to be opened using the invention. The letter, item 70 is brought near the pocket clip, item 52. The flap, item 72 of the letter is opened slightly with the pocket clip. The pen is then slid down the pocket clip, item 50 until the letter makes contact with the blade, item 60. As the letter slides across the blade, the flap of the letter is slit open.

In a simplified embodiment a letter opener is combined with a stylus. In this simplified embodiment, the letter opener and stylus exists in an elongated housing with a stylus on one end of the elongated body and a letter opener located on the same or the opposite end of the stylus. It is also contemplated that the elongated body has a stylus on both sides and or the letter opener be located on both ends. It is further contemplated in this embodiment, that the writing instrument be located in the elongated body. Additionally this embodiment may have a pocket clip where the blade is integrated in the pocket clip, and a blade protector may be used to cover the blade when inserted into a pocket.

Thus, specific embodiments and applications for a writing instrument with an integrated letter-opening blade have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A writing instrument comprising:
   an elongated writing instrument having a marking tip on one end of the instrument; and
   a pocket clip with a letter opening blade on the other end where said blade is integrated within said pocket clip
   said blade has a blade protector that protects said integrated blade, said blade being mechanically linked to operate with a extension and retraction mechanism of said marking tip such that when said marking tip is extended said blade is exposed to allow said writing instrument to open letters; and
   a stylus on at least one end of said elongated writing instrument.

2. The writing instrument of claim 1 where said marking tip is selected from one or more of the following items, pencil, pen, marker, and highlighter.

3. The writing instrument of claim 1 where said elongated writing instrument is made from one or a combination of the following materials, metal, plastic, wood, glass and mineral or something other than metal, plastic, wood, glass and mineral.

4. The writing instrument of claim 1, where said marking tip is extendable or retractable.

5. The writing instrument from claim 4 wherein said marking tip is extended and retracted when opposing ends of said elongated writing instrument are twisted in opposite directions.

6. The writing instrument from claim 4 wherein said marking tip is extended and retracted when a button located at the end opposing the marking tip is depressed.

7. The writing instrument from claim 1 wherein said extension and retraction mechanism of said marking tip moves said blade in and out of a blade protection cavity.

8. The writing instrument from claim 1 wherein pressing said stylus moves said marking tip.

\* \* \* \* \*